United States Patent
Mougin (10) Patent No.: US 9,442,258 B2
(45) Date of Patent: Sep. 13, 2016

(54) ADAPTER WITH SECURING CAGE FOR A MULTICONTACT CONNECTOR AND ASSOCIATED MULTICONTACT CONNECTOR

(71) Applicant: RADIALL, Aubervilliers (FR)

(72) Inventor: Sylvain Mougin, Le Boulay (FR)

(73) Assignee: RADIALL, Aubervilliers (FR)

( * ) Notice: Subject to any disclaimer, the term of this patent is extended or adjusted under 35 U.S.C. 154(b) by 104 days.

(21) Appl. No.: 14/253,496

(22) Filed: Apr. 15, 2014

(65) Prior Publication Data

US 2014/0308010 A1 Oct. 16, 2014

(30) Foreign Application Priority Data

Apr. 15, 2013 (FR) ...................... 13 53389

(51) Int. Cl.
 *G02B 6/40* (2006.01)
 *G02B 6/38* (2006.01)
 *G02B 6/12* (2006.01)

(52) U.S. Cl.
 CPC ............... *G02B 6/40* (2013.01); *G02B 6/3825* (2013.01); *G02B 6/3878* (2013.01); *G02B 2006/12166* (2013.01); *Y10T 29/49826* (2015.01)

(58) Field of Classification Search
 USPC .................................................. 385/75, 71
 See application file for complete search history.

(56) References Cited

U.S. PATENT DOCUMENTS

| | | |
|---|---|---|
| 5,066,096 A | 11/1991 | Krausse |
| 5,283,848 A | 2/1994 | Abendschein et al. |
| 5,563,971 A * | 10/1996 | Abendschein ....... G02B 6/3875 385/52 |
| 5,796,896 A | 8/1998 | Lee |
| 6,116,788 A | 9/2000 | Melchior et al. |
| 6,848,834 B1 | 2/2005 | Roehrs et al. |
| 8,388,235 B1 | 3/2013 | Volker et al. |
| 8,444,327 B2 | 5/2013 | Chen |
| 8,950,949 B2 | 2/2015 | Isenhour et al. |
| 2003/0156797 A1 | 8/2003 | Gherardini |
| 2006/0134990 A1 | 6/2006 | Van Der Mee et al. |
| 2006/0193562 A1 | 8/2006 | Theuerkorn |
| 2012/0064739 A1 | 3/2012 | Sell |
| 2013/0092436 A1 | 4/2013 | Silc et al. |
| 2014/0126859 A1* | 5/2014 | Fabian ................. G02B 6/3809 385/59 |
| 2015/0241643 A1 | 8/2015 | Mieville et al. |

FOREIGN PATENT DOCUMENTS

| | | |
|---|---|---|
| CH | 706932 A1 | 3/2014 |
| EP | 0 633 485 A1 | 1/1995 |

(Continued)

OTHER PUBLICATIONS

Search Report issued in French Patent Application No. 1353390 dated Mar. 7, 2014 (with translation).

(Continued)

*Primary Examiner* — Eric Wong
(74) *Attorney, Agent, or Firm* — Oliff PLC (57) ABSTRACT

The present invention relates to an adapter for a connector, notably for a multicontact connector, of the type including at least one insert, a housing containing the insert and at least one alveolus suitable for housing an alignment sleeve, notably slotted. According to the invention, each alveolus is also suitable for housing a securing cage for an alignment sleeve, by a mounting that is floating radially to its axis, over the entire length of the alignment sleeve.

17 Claims, 5 Drawing Sheets

(56) References Cited

FOREIGN PATENT DOCUMENTS

| | | |
|---|---|---|
| EP | 1 205 779 A2 | 5/2002 |
| GB | 2472584 A | 2/2011 |
| JP | 2013-41089 A | 2/2013 |

OTHER PUBLICATIONS

Written Opinion issued in French Patent Application No. 1353390 (with translation).
Search Report issued in French Patent Application No. 1353389 dated Dec. 16, 2013 (with translation).
Written Opinion issued in French Patent Application No. 1353389 (with translation).
Pending U.S. Appl. No. 14/253,145 filed Apr. 15, 2014.
May 14, 2015 Office Action issued in U.S. Appl. No. 14/253,145.
Dec. 7, 2015 Office Action issued in U.S. Appl. No. 14/253,145.
Oct. 6, 2015 Notice of Allowance issued in U.S Appl. No. 14/253,145.
Jun. 23, 2016 Office Action issued in U.S. Appl. No. 14/253,145.

\* cited by examiner

ADAPTER WITH SECURING CAGE FOR A MULTICONTACT CONNECTOR AND ASSOCIATED MULTICONTACT CONNECTOR

The present invention is an adapter for a connector, notably for a multicontact connector and an associated connector, used notably in the aeronautical/military field and more generally in severe environments.

There are currently optical multicontact connectors of the type comprising a housing accommodating an insert, this insert comprising a plurality of cavities each designed to receive an optical contact element. An optical contact element notably comprises a part, usually called a ferrule, defining an optical face and a body in which the ferrule is mounted and bearing an optical fibre facing the ferrule. An additional part, serving as an adapter, usually called "sleeve holder", is fixed to the insert, this part comprising a plurality of cavities each extending in the extension of a cavity of the insert. Each of the cavities of the adapter, hereafter called alveoli, houses an alignment sleeve designed to house two ferrules in order to allow alignment between two optical contact elements that have to be placed facing one another to establish the fibre optic connection.

These known optical connectors may be those marketed by the company RADIALL under the range name LuxCis®, notably the connectors from the series EPXA and B. Reference may advantageously be made to the patent application US 2006/134990.

When an optical link is to be produced using single-mode fibres, such as a high speed link, one technique commonly used is the so-called APC (angled physical contact) technique. This technique is notably characterized by a slanted polishing, typically at an angle of 8°, of the ends of the optical fibres to be connected. While the optical links obtained by this APC technique have the advantage of being more efficient, notably with a significant lowering of the optical reflections, they have the major drawback of being more sensitive but also more sensitive to the stresses associated with the manufacturing tolerances of the parts and with the mechanical installation. Thus, an excessive gap and/or radial misalignment and/or offset may result in not-inconsiderable signal losses.

In the known optical connectors mentioned above, the already well proven (standard) alignment sleeves consist of hollow cylinders slotted on a generatrix which are made of ceramic material, a material that is intrinsically brittle and breaks under low pressures. Furthermore, the bevel lead of an alignment sleeve, that is to say the lead through which the ferrule is introduced, may be of only very limited height. Any attempt to introduce a radial clearance that is sufficient to eliminate the mechanical stresses around the whole of an optical line, that is to say two optical contact elements and the alignment sleeve for its ferrules which are housed in a connector, brings with it proven risks of sleeve breaks, notably because the sleeve is no longer mechanically protected. Now, the sleeve breaks cause the alignment to be no longer effective. Because of this, the high-speed single-mode optical connection is not operational.

Also, it is necessary to minimize the stresses, linked to the manufacturing tolerances, on the whole of an optical line.

In a multicontact connector, the technical difficulty is how to eliminate the stresses linked to the manufacturing and mounting tolerances for all the optical lines, in particular those linked to the mounting of the adapter on the insert of the connector, while retaining alignment sleeves that are already well proven.

There is therefore a need to improve the connectors of optical type notably in order to eliminate the manufacturing and mounting-related stresses for all the optical lines, particularly those linked to the mounting of the adapter on the insert of the connector, while retaining alignment sleeves that are already well proven.

The aim of the invention is to at least partly address this need.

Thus, the subject of the invention is an adapter for a connector, notably for a multicontact connector, of the type comprising at least one insert and a housing inside which said at least one insert is fixed, the insert comprising at least one cavity suitable for at least partially housing an optical contact element, the insert having a front face on which each cavity emerges, the adapter comprising at least one cavity, a cavity of the adapter hereafter called an alveolus, suitable for housing an alignment sleeve, notably slotted, the adapter having a front face on which each alveolus emerges, the adapter being configured to be arranged with its front face bearing against the front face of the insert so as to have each alignment sleeve housed in a alveolus which receives a ferrule of an optical contact element housed in a cavity.

According to the invention, each alveolus is also suitable for housing a securing cage for an alignment sleeve, by a mounting that is floating radially to its axis (X), over the entire length of the alignment sleeve.

"Radial floating mounting" should be understood to mean, according to the invention, a mounting defined by a radial clearance between the cage and the alveolus over the entire length of the alignment sleeve. The securing cage constitutes the housing of the alignment sleeve. The cage is free to move radially within the alveolus over a given distance which is defined as being the play. Thus, the securing cage floats radially in the alveolus.

Thus, the floating mounting according to the invention implies a floating of the entire securing cage in a alveolus with a radial clearance along the longitudinal axis of the alveolus. In other words, according to the invention, provision is made to ensure that no point of the securing cage, which may be produced just as a single-piece part or as a number of parts, is not radially immobilized in the alveolus within which it is housed, that is to say is tightly fitted with the alveolus. To put it yet another way, regardless of the configuration of the securing cage, there is an assurance that, at any point of the cage, the floating mounting leaves a radial clearance remaining so as to provide an independent mechanical mounting of one particular adapter alveolus relative to the other alveoli.

The adapter according to the invention allows each optical contact line consisting of two contact elements and an alignment sleeve to be mechanically independent of the others. In other words, the floating mounting of each securing cage in a alveolus over the entire length of the alignment sleeve allows for a mounting that is independent of the other cages and therefore an independent mounting of the optical lines. Such independent floating mountings make it possible to eliminate the mechanical stresses on each of the optical lines.

By virtue of the invention, it is therefore possible to produce high-speed single-mode optical connections that are efficient and that eliminate, at the very least reduce, the signal losses which were, according to the prior art, strongly dependent on the mechanical stresses on the optical lines.

According to an advantageous embodiment, the adapter comprises two pieces assembled together, preferably by gluing, one defining the front face, and the other defining the rear face of the adapter opposite its front face.

According to an advantageous embodiment, the securing cage of longitudinal axis X1 comprises a front portion which is tubular and a rear portion, in the extension of the front portion, which consists of tabs that may be elastically deformed radially to the axis X1, the outer walls of the front and rear portions being separated by a central abutment rib designed to abut against at least one internal shoulder of a alveolus whereas the internal walls respectively of the front portion and of the rear portion in the non-deformed state of the tabs define a securing housing for the alignment sleeve.

Preferably, the radial clearance defining the floating mounting between a securing cage and an alveolus is equal to the difference in diameters between an internal diameter of the alveolus and an external diameter of the tubular front portion and/or of the rear portion in the non-deformed state of the tabs.

More preferably, the radial clearance j is between 0.1 and 0.5 mm.

According to a first embodiment of securing of the cage in a alveolus, the tabs of a securing cage comprise, at their end, a collar which may be clipped in a alveolus by forming an abutment cooperating with the central abutment rib bearing against an internal shoulder of the alveolus to produce the longitudinal securing of the cage in the alveolus along its axis (X).

According to a second embodiment of securing of the cage in a alveolus, the central abutment rib bears on either side on an internal shoulder of the alveolus to achieve the longitudinal securing of the cage in the alveolus along its axis (X).

According to an advantageous feature, the front portion comprises a collar which closely follows the form of the bore of a alveolus.

According to an advantageous variant embodiment, the securing cage comprises at least two securing lips for securing an alignment sleeve in said cage.

One of the two lips, preferably of annular form, is preferably arranged inside its tubular front portion, and the other of the lips is arranged inside the elastically deformable tabs, these two lips being arranged relative to one another to secure, both axially and radially to the axis (X1), an alignment sleeve introduced into the cage.

The securing cage may be made of at least one electrically insulating material, notably a plastic material. The securing cage may be produced as a single-piece part or as a number of parts.

Preferably, the alveolus (alveoli) or alveolus (alveoli) extends (extend) from the front face to the rear face of the adapter.

According to the invention, standard alignment sleeves may be used, that is to say sleeves, notably slotted, made of ceramic.

The front and rear faces of the adapter may be substantially of rectangular or square general form.

Alternatively, the front and rear faces of the adapter are substantially of disc general form.

Another subject of the invention is a securing cage for an adapter which has just been described.

Another subject of the invention is a connector, notably a multicontact connector, comprising:
- at least one insert comprising at least one cavity suitable for at least partially housing an optical contact element, the insert having a front face on which each cavity emerges,
- a housing inside which said at least one insert is fixed,
- at least one adapter as described previously, arranged with its front face bearing against the front face of the insert so as to have each alignment sleeve housed in a alveolus which receives a ferrule of an optical contact element housed in a cavity.

Preferably, the adapter is configured to be removably fixed to the insert and/or to the housing.

The housing may have at least a rectangular or square cross section.

Alternatively, the housing may have at least a circular cross section.

Yet another subject of the invention is a method for producing optical connections, using a first connector comprising a first insert with cavities, a second connector designed to be coupled to the first, comprising a second insert with cavities, and an adapter as described previously, the method comprising the following steps:
  assembling the adapter with the fitting of an alignment sleeve in a securing cage and, in each alveolus, the radial floating mounting of a cage radially to the axis X, over the entire length of the alignment sleeve,
  mounting optical contact elements on one of the first or second inserts,
  mounting optical contact elements on the other of the first or second inserts,
  coupling the connectors so that the adapter is sandwiched between the inserts, and producing optical connections between the connectors.

The first and second inserts may be known per se.

The adapter of a connector, notably a multicontact connector, according to the invention, may also comprise one or more alveoli for housing male and/or female electrical contact elements housed in the cavities of an insert. In other words, the invention applies also to a connector, notably a hybrid multicontact connector, that is to say a connector with one or more optical contact elements with one or more electrical contacts.

The invention will be better understood upon reading the following detailed description of nonlimiting exemplary implementations of the invention, and on studying the attached drawing, in which:

In the interests of clarity, the same references designating the same elements of a connector according to the prior art and of a connector according to the invention are used for all the FIGS. 1 to 7B.

Figure 1:
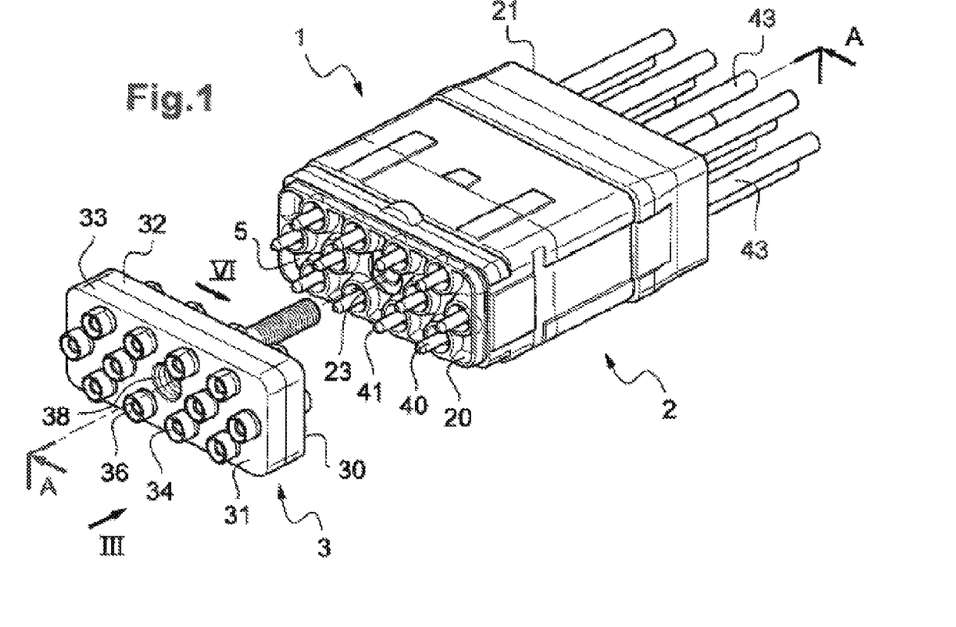
FIG. 1 represents, schematically and partially, in perspective, different elements of a first multicontact connector according to the prior art.
Figure 1A:
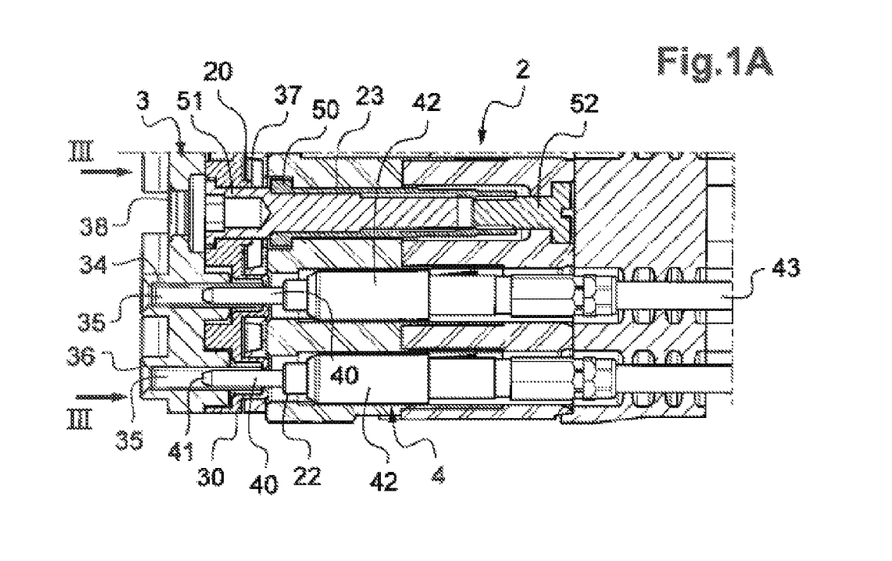
FIG. 1A represents, in longitudinal cross section along A-A, the elements of FIG. 1, assembled together.
Figure 2:
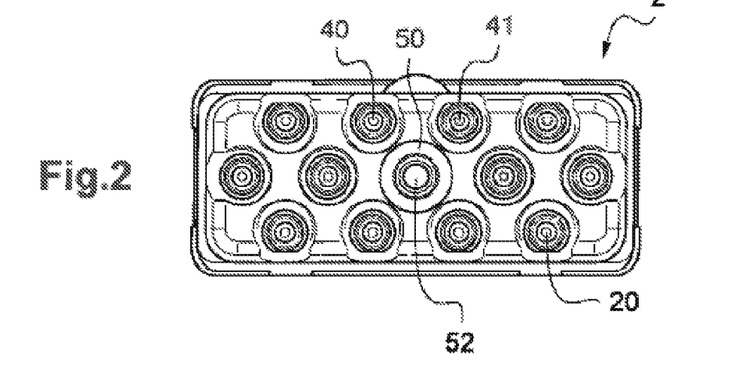
FIG. 2 is a front view along II-II, of the insert of the connector of FIG. 1.
Figure 3:
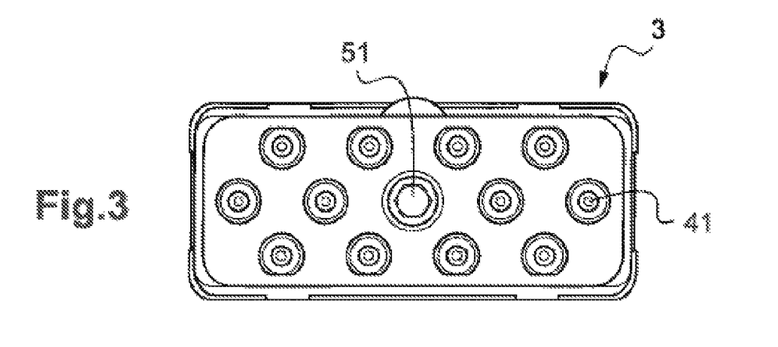
FIG. 3 is a front view along III-III, of the insert of the connector of FIG. 1A.

FIGS. 1 to 3 show the various elements of a multicontact connector according to the prior art, designated by the reference 1.

Such a connector 1 mainly comprises an insert 2, an adapter 3 and optical contact elements 4 housed in the insert 2.

The insert 2 has a substantially parallelepipedal form, with front 20 and rear 21 faces. The insert 2 also comprises a plurality of cavities 22 extending parallel to its longitudinal axis X, between the rear 21 and front 20 faces.

In the example considered, the cavities 22 are all identical.

Each cavity 22 may equally receive an optical contact element 4. As a variant, it is possible to provide, on the insert 2, at least two cavities having different forms. Thus, although not represented, the insert 2 may also be configured so that at least two of the cavities 22 receive an electrical contact element.

Each optical contact element 4 comprises a ferrule 40 defining an optical face 41 and a body 42 in which the ferrule 40 is mounted and bearing an optical fibre 43 facing the ferrule 40. The ferrule 40 is mounted with an axial float in the body 42.

The insert 2 also comprises a drilled hole 23 for receiving removable fastening elements 5 for securing the adapter 3 to the insert 2.

These fastening elements 5 comprise, for example, an internally threaded sleeve 50 in which a first screw 51 may be fixed at one end and a second screw 52 may be fixed at an opposite end.

The insert 2 and the optical contact element 4 may be of the type of those used in the optical connectors marketed by the company RADIALL under the range name LuxCis®, notably the connectors of the series EPXA and B.

The adapter 3 has a main first face 30 intended to press against the front face 20 of the insert 2 and a main second face 31 opposite the first 30.

In the example considered, the faces 30 and 31 are substantially planar and have a substantially rectangular form.

The adapter 3 comprises two elements 32 and 33 assembled together, the element 32 defining the first face 30 and the element 33 defining the second face 31.

In the example considered, the elements 32 and 33 are made of an electrically insulating material, notably of a plastic material.

The adapter 3 comprises a plurality of alveoli 34 in each of which is fitted an alignment sleeve 35 which is slotted, itself suitable for housing a ferrule 40 of an optical contact element 4, as illustrated in FIG. 1A.

Each alveolus 34 comprises, at each of its ends, a securing lip 36 making it possible to secure the slotted alignment sleeve 35 in the alveolus 34.

Each securing lip 36 is produced on a tubular portion protruding from the first face 30 or the main second face 31 of the adapter 3.

Each of the alveoli 34 of the adapter 3 is intended to be arranged in the extension of a cavity 22 of the insert 2 to allow a ferrule 40 to be housed in the alignment sleeve 35.

As illustrated, the multicontact connector according to the prior art comprises twelve alveoli 34 distributed in three rows, each of four alveoli.

As a variant, there may be more or less alveoli 34, the adapter 3 being able to comprise, for example, a single alveolus 34. The multicontact connector 1 is then reduced to a single-contact connector.

The adapter 3 has a housing 37 for receiving the head of the first screw 51 for removably fixing the adapter 3 to the insert 2. The housing 37 and therefore the head of the first screw 51 may be accessed by a screwdriver through the drilled hole 38.

As illustrated, the housing 37 is produced in a central position of the adapter 3.

The head of the first screw 51 may be fitted in the housing 37 at the time of the assembly of the elements 32 and 33 of the adapter 3.

The adapter 3 is assembled together with the insert 2 by screwing the first screw 51 onto the internally threaded sleeve 50.

In such a multicontact connector 1 according to the prior art, an optical contact element 4 may be introduced into, that is to say housed in, a cavity 22 and a alveolus 34 such that the ferrule 40 of the optical contact element 4 is engaged in the slotted sleeve 35, as illustrated in FIG. 1A.

The connector 1 is intended to be coupled to a complementary connector (not represented) comprising an insert identical to the insert 2 receiving male-type optical contact elements.

When high-speed single-mode optical connections are to be made with the optical contact elements 4, the technique called "APC polishing" is used to produce a slanted polishing of the optical fibres 43 to be connected.

This technique renders the optical lines, each consisting of an optical contact element 4 and a slotted alignment sleeve 35, more sensitive to the mechanical stresses associated with the manufacturing and installation tolerances of the different elements.

As shown in FIGS. 1 and 1A, the standard alignment sleeves 35, i.e. those conventionally used, each consists of a ceramic slotted hollow cylinder which is chamfered at its ends. In the way that they are constructed, and notably with their intrinsic fragility, the alignment sleeves 35 and an adapter 3 with their manufacturing and installation tolerances according to FIGS. 1 and 1A do not make it possible to eliminate the mechanical stresses on each optical line 4, 35 sufficiently without the risk of breaking of the sleeves.

Also, in order to eliminate all the mechanical stresses on each optical line 4, 35 in a multicontact connector 1, without the risk of breaking of the sleeves, while retaining standard slotted alignment sleeves 35, the inventors thought to make each optical line 4, 35 mechanically independent with a radial floating mounting in an adapter 3.

Figure 4:
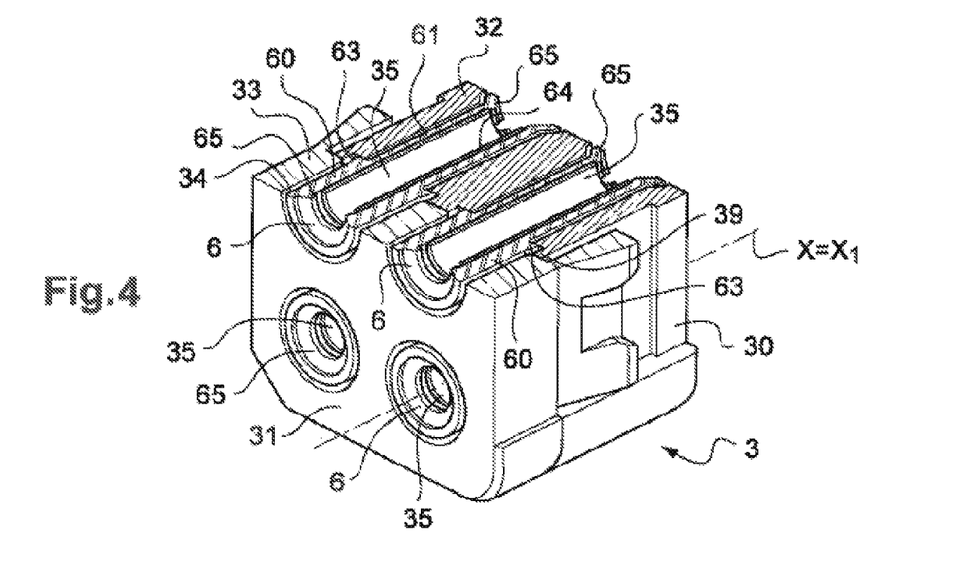
FIG. 4 is a schematic and partial perspective view of an adapter according to the invention.

Thus, as illustrated in FIG. 4, according to the invention, each alignment sleeve 35 is meant to be housed in a securing cage 6 mounted to float radially to the axis X of a alveolus 34, and to do so over the entire length of the alignment sleeve 35. This eliminates all the mechanical stresses on each optical line 4, 35 and the cage 6 mechanically protects each alignment sleeve 35.

More specifically, the adapter 3 according to the invention comprises two parts 32, 33 assembled together and of which one 32 defines the front face 30 bearing on the front face 20 of the insert 2 of the connector 1.

A securing cage 6 according to the invention is generally tubular, in a single piece of longitudinal axis X1 mounted in each alveolus 34 with a float radial to its axis X, each alveolus being defined by the respective alveoli of the two parts 32, 33 positioned facing one another at the time of their mutual assembly.

A securing cage 6 according to the invention secures an alignment sleeve 35 both radially and axially to its axis X1.

Figure 5:
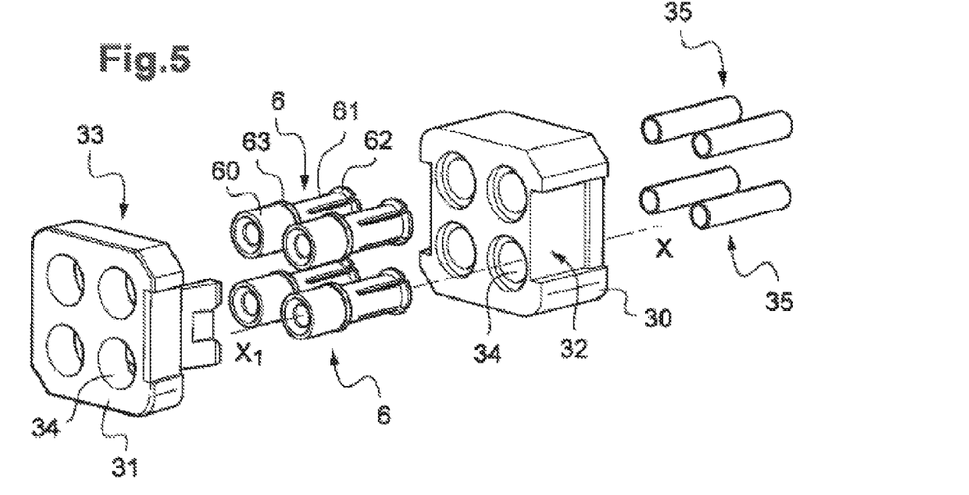
FIG. 5 is an exploded view of the various parts that make up an adapter according to a first embodiment and according to a first variant embodiment.
Figure 5B:
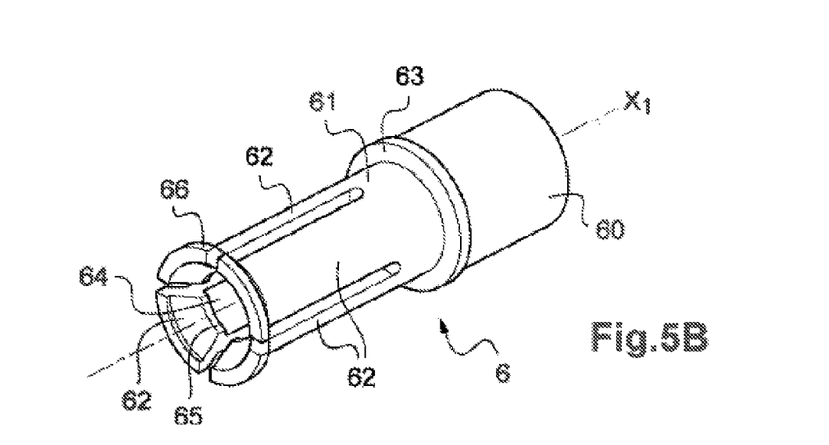
FIG. 5B is a perspective schematic view of the securing cage of the adapter according to the first embodiment and according to the first variant of FIGS. 5 and 5A.
Figure 6:
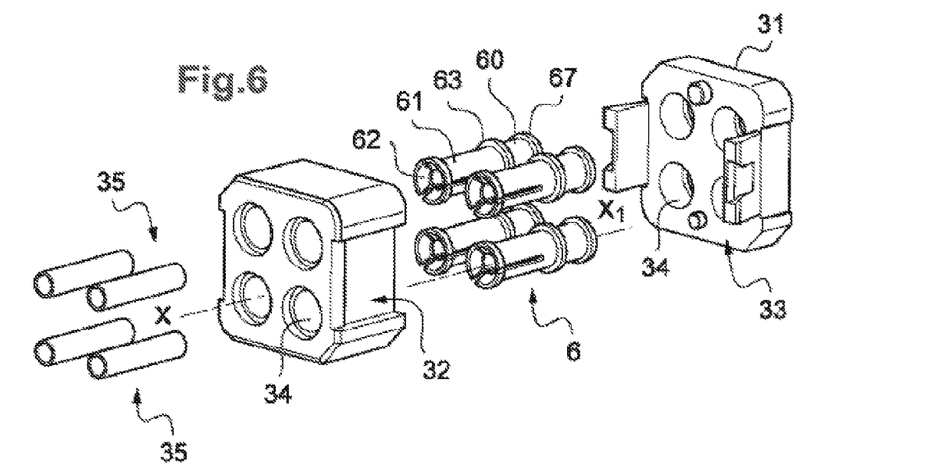
FIG. 6 is an exploded view of the various parts that make up an adapter according to the first embodiment and according to a second variant embodiment.

In the embodiments illustrated, a securing cage 6 according to the invention firstly comprises a front portion 60 which is a tubular portion and a rear portion 61, in the extension of the front portion 60, which consists of tabs 62 that may be elastically deformed radially to the axis X1.

The outer walls respectively of the front 60 and rear 61 portions are separated by a central abutment rib 63 designed to abut against at least one internal shoulder 39 of an alveolus 34.

The inner walls respectively of the front portion 60 and of the rear portion 61 in the non-deformed state of the tabs define a securing housing 64 for the alignment sleeve 35.

When the securing cage 6 is mounted in a alveolus 34 of the adapter with an alignment sleeve 35 in it and before the introduction of a ferrule 40 of an optical contact 4, the longitudinal axes X and X1 are merged.

The radial clearance defining the floating mounting between a securing cage 6 and a alveolus 34 over the entire length of the alignment sleeve 35 is equal to the difference in diameters between an internal diameter of the alveolus 34 of the adapter 3 and an external diameter of the tubular front portion 60 and/or of the rear portion 61 in the non-deformed state of the tabs 62. Preferably, the radial clearance j is between 0.2 and 0.3 mm.

Preferably, the securing cage 6 comprises at least two securing lips 65 for securing an alignment sleeve 35 in said cage.

One of its lips 65, preferably of annular form, is arranged inside its tubular front portion 60, and the other is arranged inside the elastically deformable tabs 62, these two lips 65 being arranged relative to one another to secure, both axially and radially to the axis X1, an alignment sleeve 35 introduced into the cage 6.

Thus, an alignment sleeve 35 is inserted through the rear portion 62 by spreading the tabs 62 apart until it abuts longitudinally against the securing lip 65 of the tubular front portion 60, the elasticity of the tabs 62 then retightening them against the sleeve 35 by producing the other longitudinal abutment through the other securing lip 65.

Figure 5A:
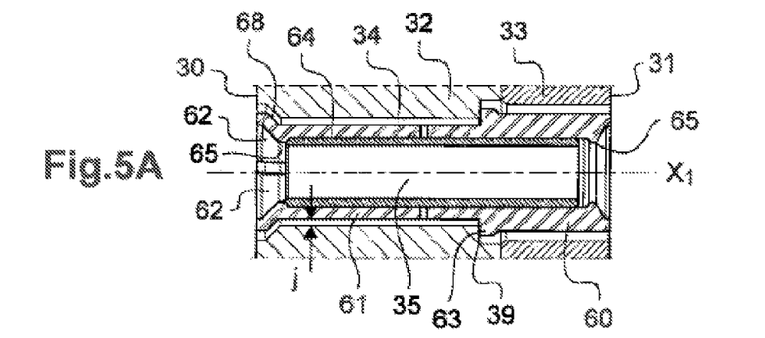
FIG. 5A represents, in longitudinal cross section, the adapter according to FIG. 5, with the various parts assembled together.
Figure 6A:
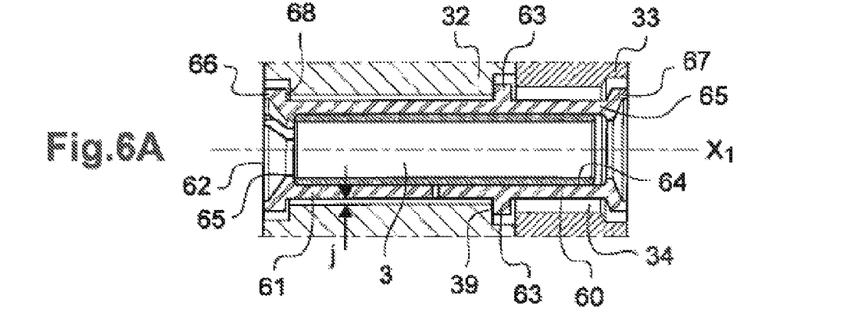
FIG. 6A represents, in longitudinal cross section, the adapter according to the first embodiment of FIG. 6, with the various parts assembled together.
Figure 6B:
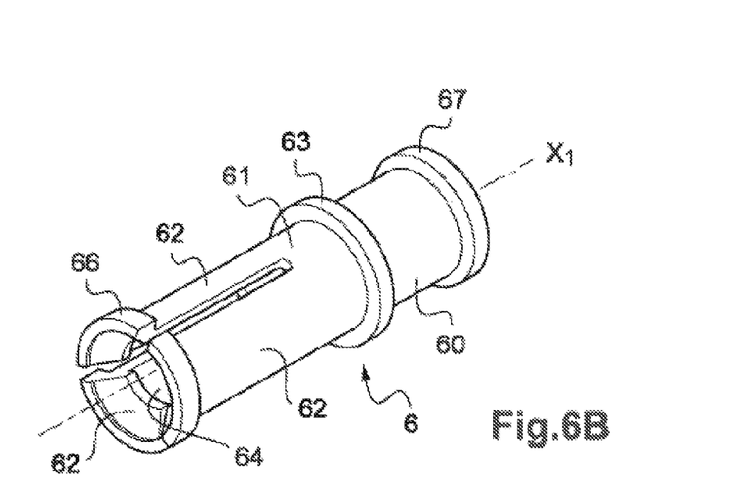
FIG. 6B is a perspective schematic view of the securing cage of the adapter according to the first embodiment and according to the second variant of FIGS. 6 and 6A.

The elastic tabs 62 of the rear portion may have one end in the form of a collar 66 whose function is, according to the embodiment described below, either only to closely follow the form of the bore of the alveolus 34 (FIG. 7A), or to both closely follow the form of the bore of the alveolus 34 and to be clipped inside this bore form by constituting an end abutment 68 which cooperates with the central abutment rib 63 to produce the longitudinal securing of the alignment sleeve 35 (FIGS. 5A and 6A).

The front tubular portion 60 may be produced with an end that is also in the form of a collar 67 whose function is to closely follow the form of the bore of the alveolus 34 (FIG. 6A).

Depending in particular on the constituent material of the securing cages 6, on their manufacturing methods and on the assembly processes, it is possible to envisage different embodiments and variants of said cage and of how it is longitudinally secured in a alveolus 34 of an adapter along its axis X.

Thus, according to a first embodiment illustrated in FIGS. 5, 5A and 5B, on the one hand, and in FIGS. 6, 6A and 6B, the tabs 62 are used, via their collar 66 forming a longitudinal abutment 68 to longitudinally secure the cage 6 in a alveolus 34.

According to this first embodiment, this abutment 68 cooperates with the central abutment rib 63 bearing against an internal shoulder 39 of a alveolus 34 to produce the longitudinal securing of the cage 6, that is to say its mechanical immobilization in the alveolus 34 along its axis X.

Figure 7:
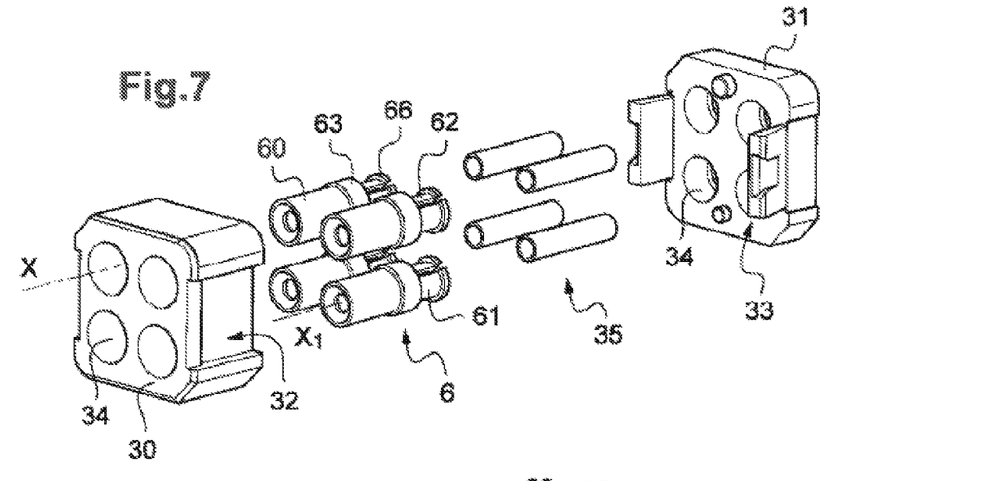
FIG. 7 is an exploded view of the various parts that make up an adapter according to a second embodiment.
Figure 7A:
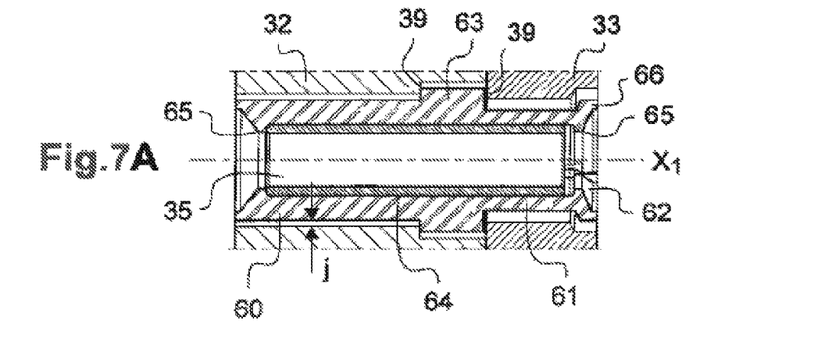
FIG. 7A represents, in longitudinal cross section, the adapter of FIG. 7, with the various parts assembled together.
Figure 7B:
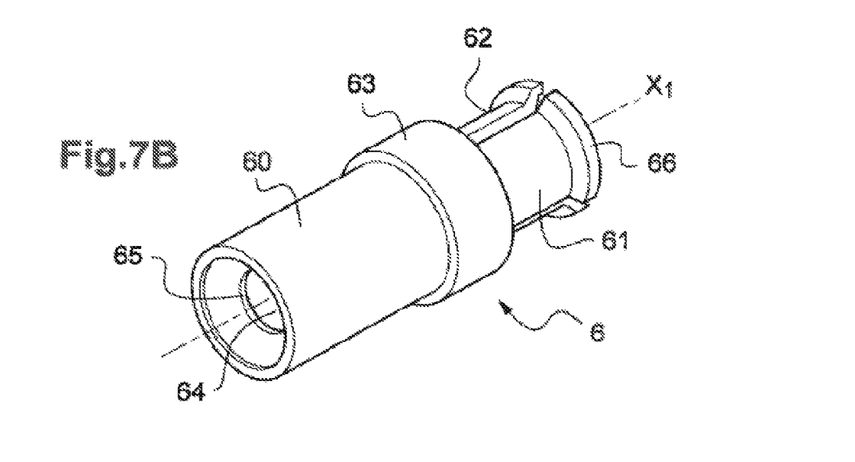
FIG. 7B is a perspective schematic view of the securing cage of the adapter of FIGS. 7 and 7A.

According to a second embodiment, distinct from the first, illustrated in FIGS. 7 to 7B, the longitudinal securing of the cage 6 in the alveolus 34 is produced solely by the central abutment rib 63 bearing on both sides on an internal shoulder 39 of the alveolus 34.

In other words, in this second embodiment, the central abutment rib 63 is immobilized longitudinally in one direction by an internal shoulder 39 produced in a part 32 of the adapter 3 and in the other direction by another internal should 39 produced by the interface between the two parts 32, 33 assembled together (FIG. 7A).

According to a first variant of the first embodiment, illustrated in FIGS. 5 to 5B, the number of elastic tabs 62, identical to each other, amounts to four and the tubular front portion 60 is collar-free.

In this first variant, the radial clearance j which defines the radial floating mounting according to the invention over the entire length of the alignment sleeve 35 is equal to the difference in diameter between the internal diameter of the alveolus 34 of the part 32 and the external diameter of the rear portion 61 consisting of the tabs 62 (FIG. 5A).

In this first variant, the external diameter of the front portion 60 is greater than that of the rear portion 61.

The procedure for assembling the various parts that make up the connector adapter 1 as illustrated in FIGS. 5 to 5B is as follows:

clipping of each securing cage 6 in the alveolus portion 34 of the part 32, tight-fit insertion of each sleeve 35 into a clipped cage 6 until it is longitudinally secured by the securing lips 65, assembly by gluing between parts 32 and 33, housing each tubular portion 60 in the alveolus portion 34 of the part 33.

According to a second variant of the first embodiment, illustrated in FIGS. 6 to 6B, the number of elastic tabs 62, identical to each other, amounts to three and a tubular front portion 60 is provided with a collar 67.

In this second variant, as in the first variant, the radial clearance j which defines the radial floating mounting according to the invention over the entire length of the alignment sleeve 35 is equal to the difference in diameter between the internal diameter of the alveolus 34 of the part 32 and the external diameter of the rear portion 61 consisting of the tabs 62 (FIG. 6A).

In this second variant, the outer diameter of the front portion 60 is equal to that of the rear portion 61.

The various parts that make up the connector adapter 1 as illustrated in FIGS. 6 to 6B are assembled in the same way as for the assembly of FIGS. 5 to 5B which has just been described.

According to a variant of the second embodiment, illustrated in FIGS. 7 to 7B, the number of elastic tabs 62, identical to each other, amounts to three and the tubular front portion 60 without collar.

In this variant of the second embodiment, the radial clearance j which defines the radial floating mounting according to the invention is equal to the difference in diameter between the internal diameter of the alveolus 34 of the part 32 and the external diameter of the tubular front portion (FIG. 7A).

In this variant of the second embodiment, the external diameter of the front portion 60 is greater than that of the rear portion 61.

The various parts that make up the connector adapter 1 as illustrated in FIGS. 7 to 7B are assembled as follows:
- tight-fit insertion of each alignment sleeve 35 in a cage 6 until it is held longitudinally by the securing lips 65,
- housing of each securing cage 6 in the alveolus portion 34 of the part 32,
- assembly by gluing between parts 32 and 33, housing each rear portion 61 in the alveolus portion 34 of the part 33.

Obviously, the invention is not limited to the examples of implementation which have just been described.

In particular, although the connector 1 represented houses only optical contact elements in the insert 2, the invention applies to a connector 1 which also houses one or more male and/or female electrical contact elements in the insert 2.

Moreover, while the securing cage 6 according to the invention that is represented is made of just a single piece part, it can also be produced in a number of parts, the radial floating mounting then being realized each of these parts in the alveolus.

The invention claimed is:

1. An adapter for a multicontact connector, the multicontact connector comprising at least one insert and a housing inside which the at least one insert is fixed, the at least one insert comprising at least one cavity suitable for at least partially housing an optical contact element, the at least one insert having a front face on which the at least one cavity emerges, and the adapter comprising:
    at least one alveolus configured to house (i) an alignment sleeve that is slotted, and (ii) a securing cage for the alignment sleeve; and
    a front face on which the at least one alveolus emerges, the front face of the adapter being configured to bear against a front face of the at least one insert such that (i) the at least one insert receives the alignment sleeve, and (ii) the alignment sleeve receives a ferrule of the optical contact element housed in the at least one cavity of the at least one insert, wherein
        the securing cage is mounted in the at least one alveolus by a radial floating mounting that defines a radial clearance between the securing cage and the alveolus over an entire length of the alignment sleeve.

2. The adapter according to claim 1, wherein the adapter includes two parts assembled together, a first part defining the front face, and a second part defining a rear face of the adapter, the rear face being opposite to the front face.

3. The adapter according to claim 2, the first part and the second part being assembled together by gluing.

4. The adapter according to claim 1, wherein
    the securing cage comprises a front portion, which is tubular, and a rear portion, the rear portion including tabs that are configured to be elastically deformed in a radial direction with respect to a longitudinal axis of the securing cage; and
    outer walls of the front portion and the rear portion are separated by a central abutment rib designed to abut against at least one internal shoulder of the at least one alveolus, and internal walls of the front portion and the rear portion, when the tabs are in in the non-deformed state, define a securing housing for the alignment sleeve.

5. The adapter according to claim 4, wherein the radial clearance between the securing cage and the at least one alveolus is equal to the difference in millimeters between (i) an internal diameter of the alveolus, and (ii) an external diameter of either the front portion or the rear portion, when the tabs are in the non-deformed state.

6. The adapter according to claim 4, wherein the radial clearance is between 0.1 mm and 0.5 mm, inclusive.

7. The adapter according to claim 4, wherein an end of each of the tabs of the securing cage include a collar which may be clipped into the at least one alveolus by forming an abutment cooperating with the central abutment rib such that the securing cage is secured in the at least one alveolus in a direction along the longitudinal axis of the securing cage.

8. The adapter according to claim 4, wherein the central abutment rib bears on either side on an internal shoulder of the at least one alveolus such that the securing cage is secured in the at least one alveolus in a direction along the longitudinal axis of the securing cage.

9. The adapter according to claim 4, wherein the front portion of the securing cage comprises a collar which closely follows the form of a bore of the at least one alveolus.

10. The adapter according to claim 4, wherein the securing cage comprises at least two securing lips configured to secure the alignment sleeve in the securing cage.

11. The adapter according to claim 10, wherein one of the two securing lips is arranged inside the front portion of the securing cage, and another of the two securing lips is arranged inside the elastically deformable tabs, the two securing lips being arranged relative to one another to secure, both axially and radially to the longitudinal axis of the securing cage, an alignment sleeve introduced into the securing cage.

12. The adapter according to claim 11, wherein at least one of the two securing lips is in annular form.

13. The adapter according to claim 2, wherein the at least one alveolus extends from the front face to the rear face of the adapter.

14. The adapter according to claim 1, wherein the alignment sleeve is made of ceramic.

15. A multicontact connector, comprising:
    at least one insert comprising at least one cavity suitable for at least partially housing an optical contact element, the insert having a front face on which each cavity emerges;
    a housing inside which the at least one insert is fixed; and
    at least one adapter according to claim 1, the at least one adapter being arranged with the front face bearing against the front face of the at least one insert so as to have the alignment sleeve housed in the alveolus which receives the ferrule of the optical contact element housed in the at least one cavity.

16. The multicontact connector according to claim 15, wherein the adapter is configured to be removably fixed to the at least one insert or to the housing.

17. Method for producing optical connections, using a first connector comprising a first insert with cavities, a second connector designed to be coupled to the first connector, the second connector comprising a second insert with cavities, and the adapter according to claim 1, the method comprising the following steps:
- assembling the adapter with the fitting of the alignment sleeve in the securing cage and, in the at least one alveolus, the radial floating mounting of the securing cage over the entire length of the alignment sleeve;
- mounting optical contact elements on one of either the first insert or the second insert;
- mounting optical contact elements on another of the first insert or the second insert;
- coupling the first connector and the second connector so that the adapter is sandwiched between the first insert and the second insert; and
- making optical connections between the first connector and the second connector.

* * * * *